(12) United States Patent
Jia (10) Patent No.: US 11,115,376 B2
(45) Date of Patent: Sep. 7, 2021

(54) METHOD AND DEVICE FOR HANDLING MULTI-TENANT REQUEST

(71) Applicant: Advanced New Technologies Co., Ltd., Grand Cayman (KY)

(72) Inventor: Xinyu Jia, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/796,679

(22) Filed: Feb. 20, 2020

(65) Prior Publication Data

US 2020/0192718 A1 Jun. 18, 2020

Related U.S. Application Data

(63) Continuation of application No. PCT/CN2018/107539, filed on Sep. 26, 2018.

(30) Foreign Application Priority Data

Nov. 17, 2017 (CN) .......................... 201711141728.6

(51) Int. Cl.
*H04L 29/12* (2006.01)
*H04L 29/08* (2006.01)

(52) U.S. Cl.
CPC .......... *H04L 61/15* (2013.01); *H04L 61/1552* (2013.01); *H04L 61/1582* (2013.01); *H04L 67/2823* (2013.01); *H04L 67/2871* (2013.01)

(58) Field of Classification Search
CPC ..... H04L 61/00; H04L 61/15; H04L 61/1582; H04L 61/1552
See application file for complete search history.

(56) References Cited

U.S. PATENT DOCUMENTS 6,003,113 A * 12/1999 Hoshino .............. G06Q 20/341
  235/492
9,979,602 B1 * 5/2018 Chinnakannan ........ H04L 47/82
(Continued)

FOREIGN PATENT DOCUMENTS

CN  103036856  4/2013
CN  103064927  4/2013
(Continued)

OTHER PUBLICATIONS

PCT International Preliminary Report on Patentability in International Application No. PCT/CN2018/107539, dated May 19, 2020, 10 pages (with English translation).
(Continued)

*Primary Examiner* — Lance Leonard Barry
(74) *Attorney, Agent, or Firm* — Fish & Richardson P.C.

(57) ABSTRACT

Implementations of the present specification provide a method and device for handling a multi-tenant request. A request to access an application from a user device is received, wherein the request includes a user identifier and request data. Tenant information corresponding to the user identifier is determined based on a mapping relationship between the user device and a tenant. Type information of the application is determined based on the request data. A first identifier of the application is extracted from the request data based on the type information of the application. The first identifier is modified to a second identifier based on the tenant information. A new request is determined based on the second identifier. The new request is sent to the application.

14 Claims, 4 Drawing Sheets

(56) References Cited

U.S. PATENT DOCUMENTS

| | | | |
|---|---|---|---|
| 2008/0162735 A1* | 7/2008 | Voigt | G06F 3/0659 710/6 |
| 2010/0241696 A1* | 9/2010 | Matoba | H04L 67/14 709/203 |
| 2011/0055279 A1* | 3/2011 | Terasaka | G06F 16/289 707/792 |
| 2011/0270886 A1 | 11/2011 | An et al. | |
| 2013/0238557 A1 | 9/2013 | Mandeltein et al. | |
| 2014/0233547 A1 | 8/2014 | Vallabhu et al. | |
| 2017/0331791 A1 | 11/2017 | Wardell et al. | |
| 2018/0302392 A1* | 10/2018 | Gordon | G06F 21/41 |
| 2019/0124589 A1* | 4/2019 | Bogineni | H04W 48/18 |
| 2019/0132188 A1* | 5/2019 | Wang | H04L 41/5051 |

FOREIGN PATENT DOCUMENTS

| | | | | |
|---|---|---|---|---|
| CN | 103957246 | | 7/2014 | |
| CN | 105049361 | | 11/2015 | |
| CN | 106326296 | | 1/2017 | |
| CN | 107153565 | | 9/2017 | |
| CN | 108093026 | | 5/2018 | |
| EP | 3232619 | | 10/2017 | |
| WO | WO 2013184846 | * | 12/2013 | |
| WO | WO-2013184846 A1 | * | 12/2013 | H04L 69/40 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2018/107, 539, dated Jan. 4, 2019, 9 pages (With Partial English Translation).

Extended European Search Report in European Application No. 18878116.5, dated May 12, 2020, 7 pages.

* cited by examiner

METHOD AND DEVICE FOR HANDLING MULTI-TENANT REQUEST

CROSS-REFERENCE TO RELATED APPLICATIONS

This application is a continuation of PCT Application No. PCT/CN2018/107539, filed on Sep. 26, 2018, which claims priority to Chinese Patent Application No. 201711141728.6, filed on Nov. 17, 2017, and each application is hereby incorporated by reference in its entirety.

TECHNICAL FIELD

One or more implementations of the present specification relate to the field of computer technologies, and in particular, to a method and a device for handling a multi-tenant request.

BACKGROUND

With an increasing demand of system resource utilization, common exclusive applications gradually cannot meet the resource utilization demand, and therefore shared applications emerged.

The shared applications are generally implemented by using multi-tenant technology. The idea of the multi-tenant technology is allowing multiple tenants to share one application. Therefore, how to quickly and accurately allow multiple tenants to share one application becomes a problem to be resolved.

SUMMARY

One or more implementations of the present specification describe a method and a device for handling a multi-tenant request, to quickly and accurately share an application among multiple tenants.

According to a first aspect, a method for handling a multi-tenant request is provided and includes: receiving a request to access an application from a user, where the request includes a user identifier and request data of the user; determining tenant information corresponding to the user identifier based on a mapping relationship between a user and a tenant; determining a type of the application based on the request data; extracting a first identifier of the application from the request data based on the type; modifying the first identifier to a second identifier based on the tenant information; and determining a new request based on the second identifier and sending the new request.

According to a second aspect, a device for handling a multi-tenant request is provided and includes: a receiving unit, configured to receive a request to access an application from a user, where the request includes a user identifier and request data of the user; a determining unit, configured to determine tenant information corresponding to the user identifier based on a mapping relationship between a user and a tenant, where the determining unit is further configured to determine a type of the application based on the request data; an extraction unit, configured to extract a first identifier of the application from the request data based on the type determined by the determining unit; a modification unit, configured to modify the first identifier extracted by the extraction unit to a second identifier based on the tenant information determined by the determining unit, where the determining unit is further configured to determine a new request based on the second identifier that the modification unit modifies the first identifier to; and a sending unit, configured to send the new request.

According to the method and the device for handling a multi-tenant request provided in the one or more implementations of the present specification, a request to access an application is received from a user, and a mapping relationship between a user and a tenant is searched for tenant information corresponding to the user; a type of the application to be accessed is determined based on request data in the request; a unique identifier of the application is extracted from the request data based on the type of the application; the extracted unique identifier is modified based on the tenant information, to obtain a modified request; and the modified request is forwarded to the application. Therefore, an application can be quickly and accurately shared among multiple tenants.

BRIEF DESCRIPTION OF DRAWINGS

To describe technical solutions in implementations of the present disclosure more clearly, the following briefly describes the accompanying drawings needed for describing the implementations. Apparently, the accompanying drawings in the following descriptions merely show some implementations of the present disclosure, and a person of ordinary skill in the art can still derive other drawings from these accompanying drawings without creative efforts.

DESCRIPTION OF IMPLEMENTATIONS

The solution provided in the present specification is described below with reference to the accompanying drawings.

Figure 1:
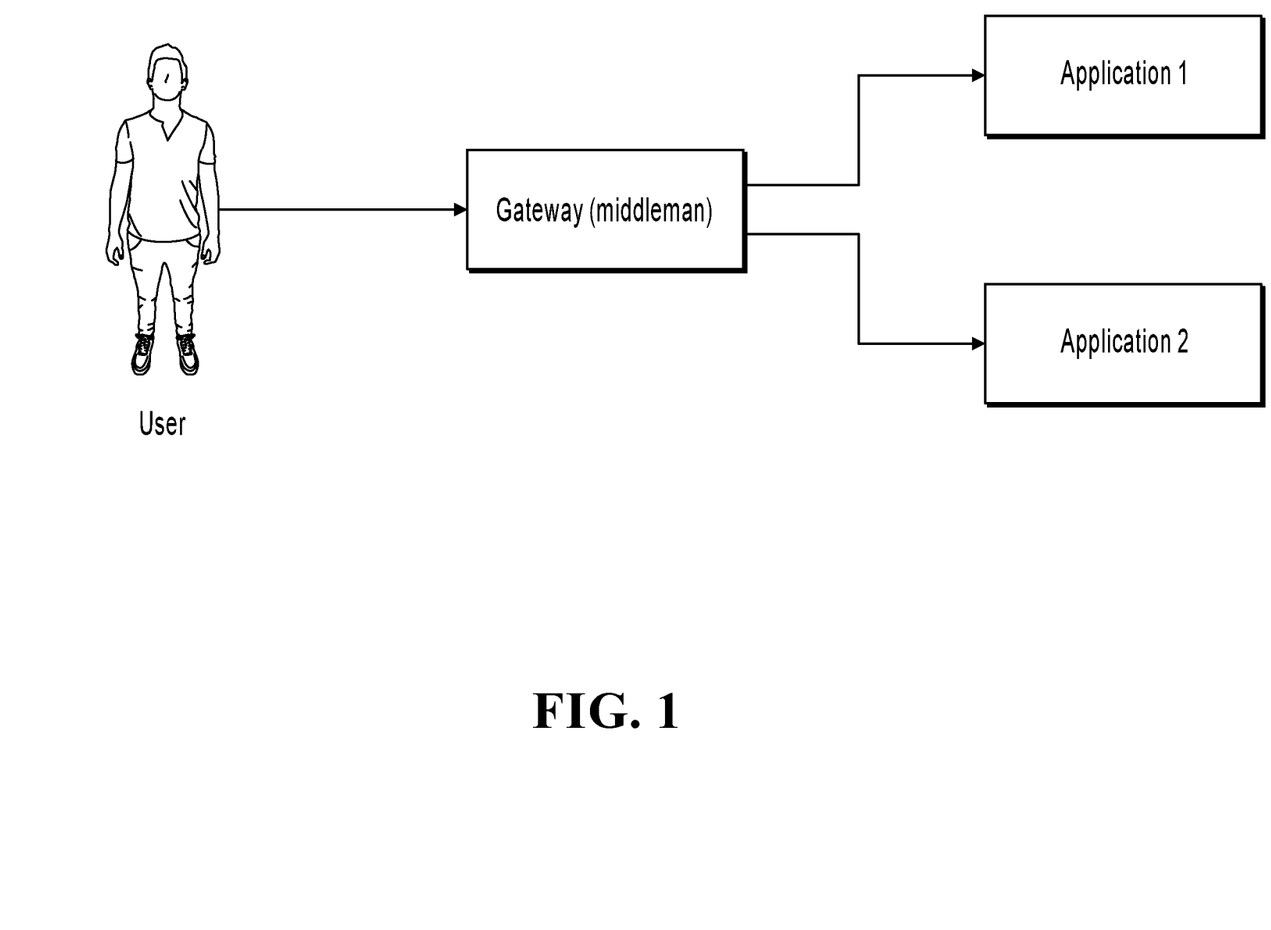
FIG. 1 is a schematic diagram illustrating an application scenario of a method for handling a multi-tenant request, according to an implementation of the present specification.

A method for handling a multi-tenant request provided in an implementation of the present specification is applicable to a scenario shown in FIG. 1. In FIG. 1, one user can uniquely belong to one tenant, but one tenant can correspond to multiple users. A gateway (also referred to as a middleman) is configured to receive a request to access an application sent by a user and forward the request to the corresponding application; and is further configured to receive a response message returned by the application and forward the response message to the user. It is worthwhile to note that in the present specification, the gateway can modify the received request or the returned response message, and a specific modification method is subsequently described. Application 1 (or application 2) in FIG. 1 may be, for example, a database (DB) or ElasticSearch (a search server).

It is worthwhile to note that the gateway in FIG. 1 can appear in an independent form or in an application plug-in form.

Figure 2:
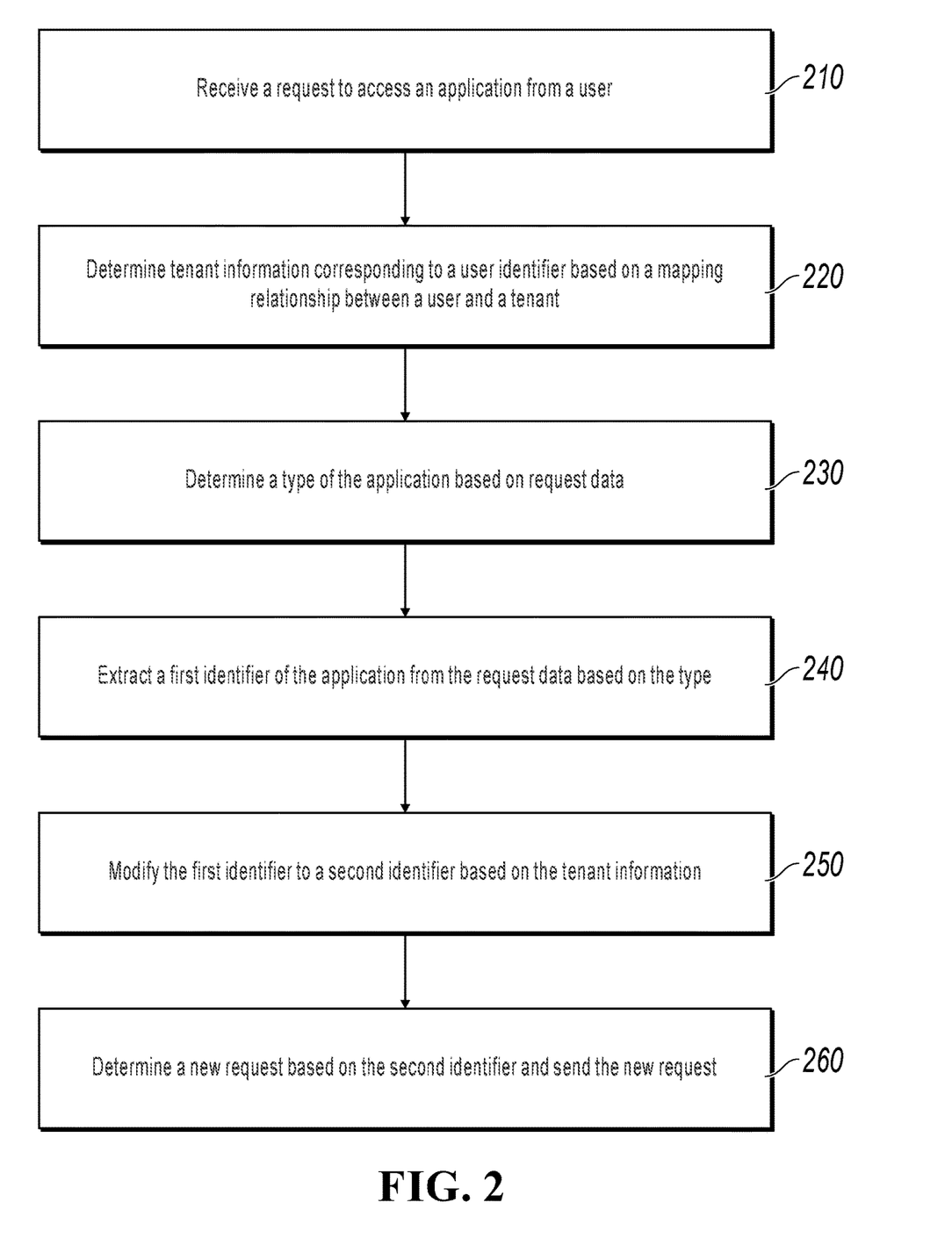
FIG. 2 is a flowchart illustrating a method for handling a multi-tenant request, according to an implementation of the present specification.

FIG. 2 is a flowchart illustrating a method for handling a multi-tenant request, according to an implementation of the present specification. The method can be executed by a device that has handling capability: a server, a system, or a device, for example, the gateway in FIG. 1. As shown in FIG. 2, the method can specifically include the following steps:

Step 210: Receive a request to access an application from a user.

The request can include a user identifier and request data of the user, and the request data can include information such as a protocol type.

In this implementation, for example, the request to access the application is "http://hostname:port/Index=indexName&+++".

Step 220: Determine tenant information corresponding to the user identifier based on a mapping relationship between a user and a tenant.

Here, the mapping relationship between a user and a tenant can be stored in a two-dimensional relationship table. The tenant information can be a unique tenant identifier, etc. For example, the tenant information is the unique tenant identifier, and the mapping relationship between a user and a tenant can be shown in Table 1.

TABLE 1

| User identifier | Unique tenant identifier |
| --- | --- |

Step 230: Determine a type of the application based on the request data.

In an implementation, the type of the application can be determined by analyzing the protocol type in the request data. Certainly, in practice, the type of the application can be determined in other ways. For example, the type of the application is determined by determining whether the request data includes one or more predetermined characters or one or more predetermined character strings, and the one or more predetermined characters or one or more predetermined character strings correspond to a particular type of application. Such description is not repeatedly provided in the present specification.

Step 240: Extract a first identifier of the application from the request data based on the type.

The first identifier here can be any identifier that can uniquely identify the application.

In an implementation, step 240 can include the following steps:

Step A: Determine an identification field corresponding to the type of application based on a mapping relationship between an application type and an identification field.

Here, the identification field can be a field representing a unique key in the application, and a field value of the identification field can uniquely identify the application. The mapping relationship between an application type and an identification field can be stored in a two-dimensional relationship table or stored in a storage system of a key value (KV) structure. When the mapping relationship is stored in the storage system of the KV structure, K can be the application type. In the present specification, the mapping relationship can be manually predetermined.

In step A, different types of applications usually correspond to different identification fields. For example, when an application is a "DB", an identification field corresponding to the application can be "DataBase"; and when an application is "ElasticSearch", an identification field corresponding to the application can be "Index". It is worthwhile to note that the previous description is merely an exemplary description given for facilitating understanding of this implementation, and is not intended to limit the solution given in the present specification. In practice, an identification field corresponding to "DB" or "ElasticSearch" can be others.

Step B: Extract the field value of the identification field from the request data based on the identification field.

For example, the request is "http://hostname:port/Index=indexName&+++". When the identification field corresponding to the application is "Index", the extracted field value of the identification field is "indexName".

Step C: Use the field value as the first identifier.

As described in the previous example, the first identifier is "indexName".

In another implementation, step 240 can include the following steps:

Step a: Determine an extraction method of the field value of the identification field corresponding to the type of application based on a mapping relationship between an application type and an extraction method of a field value of an identification field.

The mapping relationship between an application type and an extraction method of a field value of an identification field can be stored in a two-dimensional relationship table, or stored in a storage system of a key value (KV) structure. When the mapping relationship is stored in the storage system of the KV structure, K can be the application type. In the present specification, the mapping relationship can be manually predetermined. In another implementation of the present specification, the two-dimensional relationship table or the storage system of the KV structure can further include other content, such as an identification field, and is not limited in the present specification.

In the present specification, different types of applications correspond to different extraction methods of field values of identification fields. In a specific implementation, the extraction method can be a regular rule. For example, the extraction method can include extracting a bit of a path in a uniform resource locator (URL) or extracting content in a JSON format. For example, an application is "ElasticSearch", and an extraction method corresponding to the application can be extracting the first bit of a path in a URL.

Step b: Extract the field value of the identification field from the request data based on the extraction method.

For example, the requested application is "ElasticSearch" and the request is "http://hostname:port/{indexName}/+++". When the first bit of the path in the URL is extracted, the field value of the identification field extracted from the request data is "indexName".

Step c: Use the field value as the first identifier.

Step 250: Modify the first identifier to a second identifier based on the tenant information.

In an implementation, the modifying the first identifier to a second identifier based on the tenant information can include appending the tenant information to the first identifier to obtain the second identifier. As described in the previous example, if the tenant information is "A", the second identifier can be "indexName A". It is worthwhile to note that the second identifier here is merely an example for illustration. In practice, the second identifier can be any identifier that can reflect the tenant information and can uniquely identify the application, and is not limited to in the present specification.

Step 260: Determine a new request based on the second identifier and send the new request.

It can be understood that after the first identifier in the original request is modified to the second identifier, the request becomes the new request. That is, a difference between the new request and the original request lies in that the two requests include different identifiers of the application. After the new request is obtained, the corresponding application correspondingly handles the new request and returns a response message.

After receiving the response message, the second identifier can be extracted from the response message with reference to the extraction method of the first identifier. Then, the second identifier is modified to the first identifier based on the tenant information. Specifically, the tenant information can be removed from the second identifier to obtain the first identifier. As described in the previous example, the tenant information "A" is removed from the second identifier "indexName_A" to obtain "indexName". After the second identifier in the response message is modified to the first identifier, the response message becomes a new response message. That is, a difference between the new response message and the original response message lies in that the two response messages include different identifiers of the application. After the new response message is obtained, the response message is returned to the user.

In summary, in the previous implementation of the present specification, the method of modifying the first identifier in the request to the second identifier and then modifying the second identifier in the response message to the first identifier achieves a multi-tenant implementation that is transparent to both the user and the application.

In addition, in the previous implementations of the present specification, multi-tenancy is moved up from an application level to a gateway level, that is, multi-tenancy is implemented by using the front end gateway. Without a modification to the application, an exclusive type and a shared type maintain the same source code for future version iterations. Multiple applications only need to be configured at the gateway, and therefore are easy to use. Even closed source applications can easily implement multi-tenancy.

Figure 3:
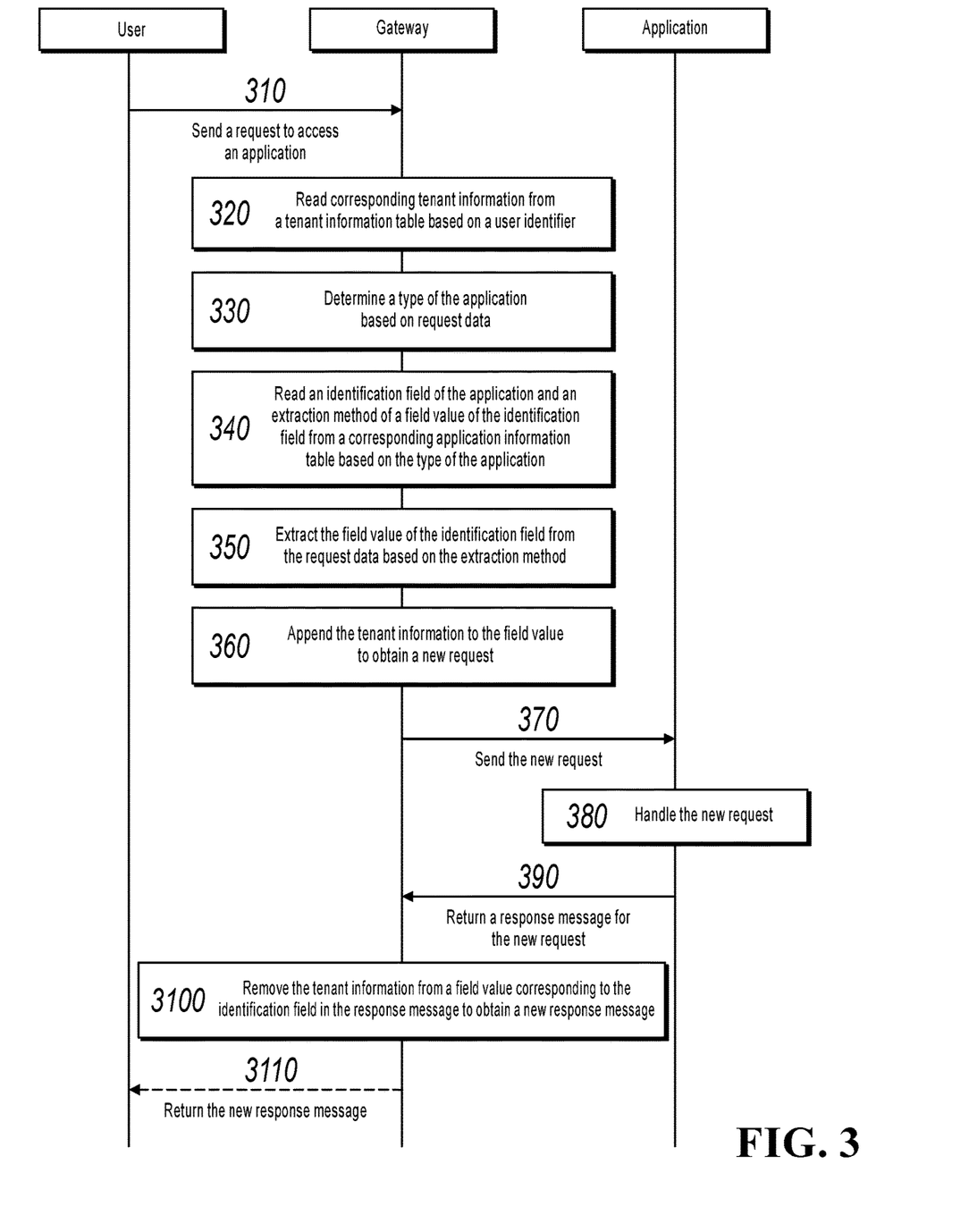
FIG. 3 is an information exchange diagram illustrating a method for handling a multi-tenant request, according to another implementation of the present disclosure.

FIG. 3 is an information exchange diagram illustrating a method for handling a multi-tenant request, according to another implementation of the present specification. As shown in FIG. 3, the method can specifically include the following steps:

Step 310: A user sends a request to access an application to a gateway.

The request can include a user identifier and request data of the user.

Step 320: Read corresponding tenant information from a tenant information table based on the user identifier.

The tenant information table can be used to record a mapping relationship between a user and a tenant.

Step 330: Determine a type of the application based on the request data.

Step 340: Read an identification field of the application and an extraction method of a field value of the identification field from a corresponding application information table based on the type of the application.

The application information table is used to record a mapping relationship between an application type, an identification field, and an extraction method of a field value of the identification field.

Step 350: Extract the field value of the identification field from the request data based on the extraction method.

Step 360: Append the tenant information to the field value to obtain a new request.

Step 370: The gateway sends the new request to the application.

Step 380: The application handles the new request.

Step 390: The application returns a response message for the new request to the gateway.

Step 3100: Remove the tenant information from a field value corresponding to the identification field in the response message to obtain a new response message.

Step 3110: Return the new response message to the user.

According to the method for handling a multi-tenant request provided in the one or more implementations of the present specification, an application can be quickly and accurately shared among multiple tenants.

Figure 4:
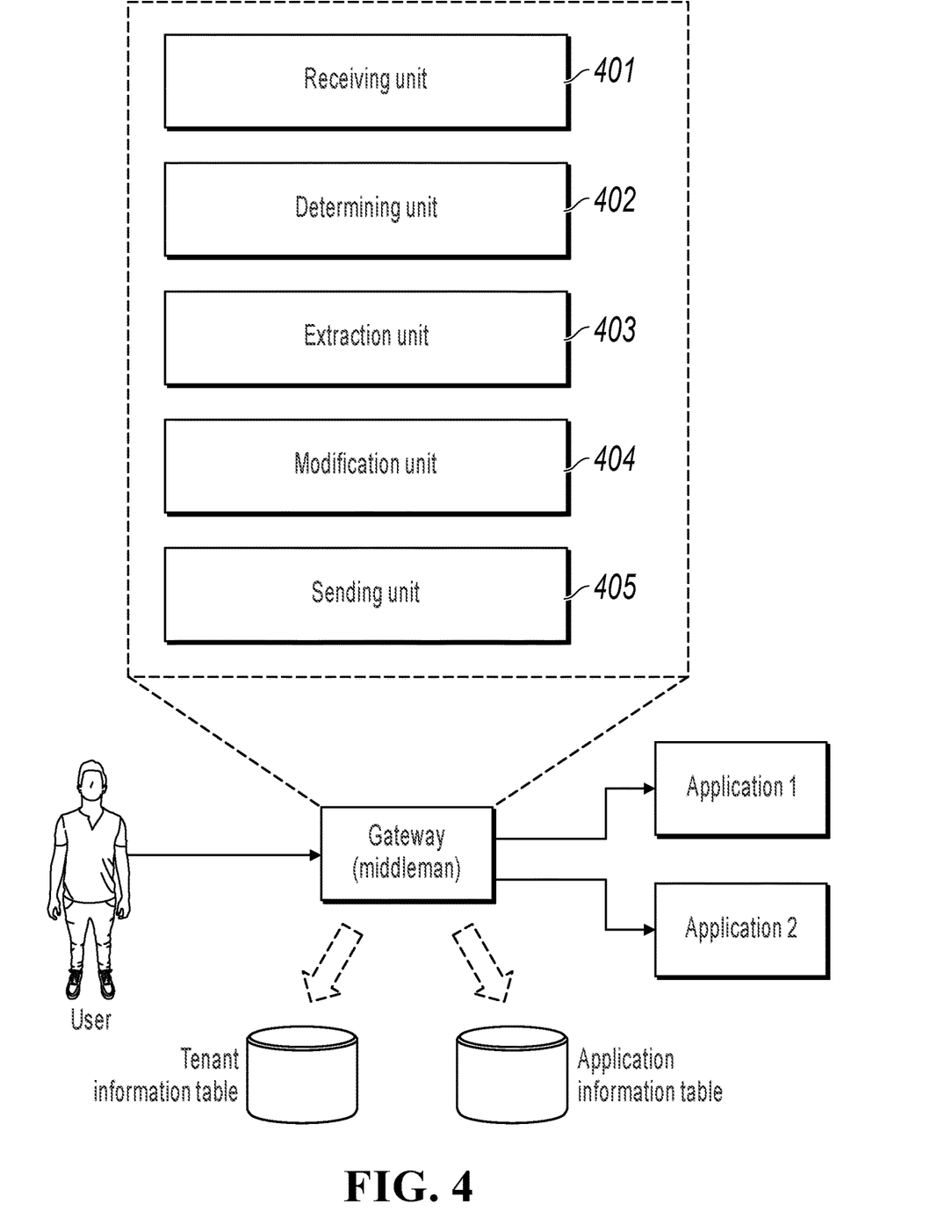
FIG. 4 is a schematic diagram illustrating a device for handling a multi-tenant request, according to an implementation of the present specification.

Corresponding to the previous method for handling a multi-tenant request, as shown in FIG. 4, an implementation of the present specification further provides a device for handling a multi-tenant request. The device includes receiving unit 401, determining unit 402, extraction unit 403, modification unit 404, and sending unit 405.

Receiving unit 401 is configured to receive a request to access an application from a user, where the request includes a user identifier and request data of the user.

Determining unit 402 is configured to determine tenant information corresponding to the user identifier based on a mapping relationship between a user and a tenant.

Determining unit 402 is further configured to determine a type of the application based on the request data.

Extraction unit 403 is configured to extract a first identifier of the application from the request data based on the type determined by determining unit 402.

Optionally, extraction unit 403 can be specifically configured to: determine an identification field corresponding to the type of application based on a mapping relationship between an application type and an identification field; extract a field value of the identification field from the request data based on the identification field; and use the field value as the first identifier; or determine an extraction method of the field value of the identification field corresponding to the type of application based on a mapping relationship between an application type and an extraction method of a field value of an identification field; extract the field value of the identification field from the request data based on the extraction method; and use the field value as the first identifier.

The mapping relationship between an application type and an identification field can be stored in a two-dimensional relationship table or stored in a storage system of a key value (KV) structure. The mapping relationship between an application type and an extraction method of a field value of an identification field can be stored in a two-dimensional relationship table or stored in a storage system of a key value (KV) structure.

Modification unit 404 is configured to modify the first identifier extracted by the extraction unit 403 to a second identifier based on the tenant information determined by determining unit 402.

Determining unit 402 is further configured to determine a new request based on the second identifier that modification unit 404 modifies the first identifier to.

Sending unit 405 is configured to send the new request.

Optionally, receiving unit 401 is further configured to receive a response message for the new request, where the response message includes the second identifier.

Modification unit 404 is further configured to modify the second identifier to the first identifier based on the tenant information.

Determining unit 402 is further configured to determine a new response message based on the first identifier that modification unit 404 modifies the second identifier to.

Sending unit 405 is further configured to return the new response message determined by the determining unit 402 to the user.

Optionally, modification unit 404 can be specifically configured to: append the tenant information to the first identifier to obtain the second identifier; and correspondingly, remove the tenant information from the second identifier to obtain the first identifier.

The functions of the functional modules of the device in the previous implementation of the present specification can be implemented by using the steps in the previous method implementation. Therefore, a specific working process of the device provided in this implementation of the present specification is omitted here.

In the device for handling a multi-tenant request provided in this implementation of the present specification, receiving unit 401 receives a request to access an application from a user, where the request includes a user identifier and request data of the user; determining unit 402 determines tenant information corresponding to the user identifier based on a mapping relationship between a user and a tenant; determining unit 402 determines a type of the application based on the request data; extraction unit 403 extracts a first identifier of the application from the request data based on the type; modification unit 404 modifies the first identifier to a second identifier based on the tenant information; determining unit 402 determines a new request based on the second identifier; and sending unit 405 sends the new request. Therefore, an application can be quickly and accurately shared among multiple tenants.

A person skilled in the art should be aware that, in the previous one or more examples, the functions described in the present disclosure can be implemented by using hardware, software, firmware, or any combination thereof. When the functions are implemented by using software, the functions can be stored in a computer-readable medium or transmitted as one or more instructions or code on the computer-readable medium.

In the previously described specific implementations, the objective, technical solutions, and beneficial effects of the present disclosure are further described in detail. It should be understood that the previous descriptions are merely specific implementations of the present disclosure and are not intended to limit the protection scope of the present disclosure. Any modification, equivalent replacement, improvement, etc. made on the basis of the technical solutions of the present disclosure shall fall within the protection scope of the present disclosure.

What is claimed is:

1. A computer-implemented method, comprising:
   receiving a request to access an application from a user device, wherein the request comprises a user identifier and request data, wherein the application is hosted by a server, and wherein the user identifier is associated with a user of the user device;
   determining tenant information corresponding to the user identifier based on a mapping relationship between the user and a tenant;
   determining type information of the application based on the request data;
   extracting a first identifier of the application from the request data based on the type information of the application;
   appending the tenant information to the first identifier of the application to obtain a second identifier;
   determining a new request based on the second identifier;
   sending the new request to the application;
   receiving a response message for the new request, wherein the response message comprises the second identifier;
   removing the tenant information from the second identifier to obtain the first identifier of the application;
   determining a new response message based on the first identifier; and
   returning the new response message to the user device.

2. The computer-implemented method of claim 1, wherein extracting the first identifier of the application from the request data based on the type information comprises:
   determining an identification field corresponding to the type information of the application based on a mapping relationship between an application type and the identification field;
   extracting a field value of the identification field from the request data based on the identification field; and
   using the field value as the first identifier.

3. The computer-implemented method of claim 2, wherein the mapping relationship between the application type and the identification field is stored in a two-dimensional relationship table or stored in a storage system of a key value (KV) structure.

4. The computer-implemented method of claim 1, wherein the extracting a first identifier of the application from the request data based on the type information comprises:
   determining an extraction method of a field value of an identification field corresponding to the type information of the application based on a mapping relationship between an application type and the extraction method of the field value of the identification field;
   extracting the field value of the identification field from the request data based on the extraction method; and
   using the field value as the first identifier.

5. The computer-implemented method of claim 4, wherein the mapping relationship between the application type and the extraction method of the field value of the identification field is stored in a two-dimensional relationship table or stored in a storage system of a key value (KV) structure.

6. A non-transitory, computer-readable medium storing one or more instructions executable by a computer system to perform operations comprising:
   receiving a request to access an application from a user device, wherein the request comprises a user identifier and request data, wherein the application is hosted by a server, and wherein the user identifier is associated with a user of the user device;
   determining tenant information corresponding to the user identifier based on a mapping relationship between the user and a tenant;
   determining type information of the application based on the request data;
   extracting a first identifier of the application from the request data based on the type information of the application;
   appending the tenant information to the first identifier of the application to obtain a second identifier;
   determining a new request based on the second identifier;
   sending the new request to the application;
   receiving a response message for the new request, wherein the response message comprises the second identifier;
   removing the tenant information from the second identifier to obtain the first identifier of the application;
   determining a new response message based on the first identifier; and
   returning the new response message to the user device.

7. The non-transitory, computer-readable medium of claim 6, wherein extracting the first identifier of the application from the request data based on the type information comprises:
  determining an identification field corresponding to the type information of the application based on a mapping relationship between an application type and the identification field;
  extracting a field value of the identification field from the request data based on the identification field; and
  using the field value as the first identifier.

8. The non-transitory, computer-readable medium of claim 7, wherein the mapping relationship between the application type and the identification field is stored in a two-dimensional relationship table or stored in a storage system of a key value (KV) structure.

9. The non-transitory, computer-readable medium of claim 6, wherein the extracting a first identifier of the application from the request data based on the type information comprises:
  determining an extraction method of a field value of an identification field corresponding to the type information of the application based on a mapping relationship between an application type and the extraction method of the field value of the identification field;
  extracting the field value of the identification field from the request data based on the extraction method; and
  using the field value as the first identifier.

10. The non-transitory, computer-readable medium of claim 9, wherein the mapping relationship between the application type and the extraction method of the field value of the identification field is stored in a two-dimensional relationship table or stored in a storage system of a key value (KV) structure.

11. A computer-implemented system, comprising:
  one or more computers; and
    one or more computer memory devices interoperably coupled with the one or more computers and having tangible, non-transitory, machine-readable media storing one or more instructions that, when executed by the one or more computers, perform operations comprising:
      receiving a request to access an application from a user device, wherein the request comprises a user identifier and request data, wherein the application is hosted by a server, and wherein the user identifier is associated with a user of the user device;
      determining tenant information corresponding to the user identifier based on a mapping relationship between the user and a tenant;
      determining type information of the application based on the request data;
      extracting a first identifier of the application from the request data based on the type information of the application;
      appending the tenant information to the first identifier of the application to obtain a second identifier;
      determining a new request based on the second identifier;
      sending the new request to the application;
      receiving a response message for the new request, wherein the response message comprises the second identifier;
      removing the tenant information from the second identifier to obtain the first identifier of the application;
      determining a new response message based on the first identifier; and
      returning the new response message to the user device.

12. The computer-implemented system of claim 11, wherein extracting the first identifier of the application from the request data based on the type information comprises:
  determining an identification field corresponding to the type information of the application based on a mapping relationship between an application type and the identification field;
  extracting a field value of the identification field from the request data based on the identification field; and
  using the field value as the first identifier.

13. The computer-implemented system of claim 12, wherein the mapping relationship between the application type and the identification field is stored in a two-dimensional relationship table or stored in a storage system of a key value (KV) structure.

14. The computer-implemented system of claim 11, wherein the extracting a first identifier of the application from the request data based on the type information comprises:
  determining an extraction method of a field value of an identification field corresponding to the type information of the application based on a mapping relationship between an application type and the extraction method of the field value of the identification field;
  extracting the field value of the identification field from the request data based on the extraction method; and
  using the field value as the first identifier.

* * * * *